3,154,560
N,N'-AZAALKYLENE-BIS(ALKENYL-
SUCCINIMIDES)
Carl Osuch, Kirkwood, Mo., assignor to Monsanto
Company, a corporation of Delaware
No Drawing. Filed Dec. 4, 1961, Ser. No. 156,991
9 Claims. (Cl. 260—326.3)

This invention relates to certain new N,N'-azaalkylene-bis(alkenylsuccinimides) (hereinafter sometimes referred to as "bis-imides") and to lubricating oil compositions containing said bis-imides.

Under the conditions encountered in a large percentage of present-day automobile driving (i.e., the so-called stop-and-go driving), automobile engines do not attain their most desirable and efficient operating temperatures. As a result, large quantities of oil-insoluble oxidation products are formed which eventually find their way into the crankcase, where they tend to deposit on the internal parts of the engine, resulting in further inefficient engine operation.

In present-day practice, deposition of the oxidation products is minimized by incorporating into lubricating oils metal-containing detergents. The use of metal-containing detergents, however, has not been totally satisfactory since such detergents form ash deposits in the combustion chambers of engines, fouling the spark plugs and creating other problems.

It has now been found that the problems associated with the use of metal-containing detergents-dispersants can be avoided by the use of certain new ashless detergents-dispersants, which are N,N'-azaalkylene-bis(alkenylsuccinimides).

The N,N'-azaalkylene-bis(alkenylsuccinimides) of this invention, which can be represented by the structural formula,

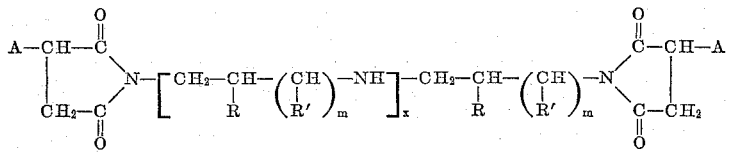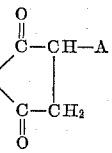

where A is an alkenyl radical having a molecular weight of from about 500 to about 2,000, preferably about 700 to about 1,500, x is a whole number from one to four, and R and R' are each selected from hydrogen and alkyl radicals having from one to three carbon atoms, and m is a whole number from zero to three, can be prepared by heating a toluene, or other hydrocarbon, solution of an alkenylsuccinic anhydride and an azaalkyleneamine at temperatures of about 100° C. to 175° C. using molar ratios of anhydride to amine of from about 2:1 to about 2.5:1, while continuously distilling the water formed from the reaction.

The alkenylsuccinic anhydrides useful in the preparation of the compounds of this invention can be prepared by means known to those skilled in the art, as, for example, by heating maleic anhydride with an olefin polymer at temperatures of about 150° C. to 250° C. in molar ratios of from about 1:1 to about 5:1, respectively. Suitable olefin polymers are the polymers of the lower alkenes; e.g., polymers of ethylene, propylene, butylene, isobutylene, and mixtures thereof, having a molecular weight of from about 500 to about 2,000, but preferably about 700 to about 1,500.

Since the reaction between the olefin polymer and maleic anhydride may not go to completion, the resulting alkenylsuccinic anhydride can contain some unreacted olefin polymer which can be allowed to remain as a diluent with no harmful effects upon the performance of the additive.

The azaalkyleneamines can be represented by the structure,

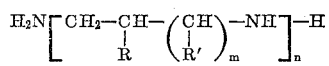

where R and R' are selected from hydrogen and alkyl groups having from one to three carbon atoms, m is a whole number from zero to three, and n is a whole number from two to five. The azaalkyleneamines are available commercially, but can also be prepared from alkylene dichlorides and ammonia. Examples of azaalkylenes useful in preparing the bis-imides of this invention are diethylene triamine, dipropylene triamine, dibutylene triamine, dipentylene triamine, triethylene tetramine, tripropylene tetramine, tetraethylene pentamine, and the like, and mixtures thereof.

Lubricating oils which can be used as the base oils to which the new compounds of this invention are added are not limited as far as the detergent-dispersant effects of the bisimides are concerned, and, accordingly, lubricating oils which are of a naphthenic base, paraffinic base, and other hydrocarbon bases, as well as lubricating oils derived from coal products and synthetic oils, such as the alkylene polymers, alkylene oxide polymers, dicarboxylic acid esters, alkylated benzene, silicate esters, silicon polymers, and the like, are suitable.

The N,N'-azaalkylene-bis(alkenylsuccinimides) of this invention can be used in lubricating oils in amounts of from about 0.05% to about 25% by weight. It has been found, however, that for most applications, amounts of from about 0.5% to about 10% by weight are sufficient. In addition, the bis-imides of this invention can be used in fuel oils and in various light products, such as gasoline, wherein they also function as detergents-dispersants.

The preparation of typical N,N'-azaalkylene-bis(alkenyl-succinimides) of this invention is illustrated in the following non-limiting examples, wherein parts are parts by weight unless otherwise stated. The number in parentheses following the name of the alkenyl group represents the approximate molecular weight of this side chain.

EXAMPLE 1

Into a two-liter, stainless steel, Parr autoclave, there were charged 800 parts of polybutene, having a molecular weight of about 935, and 135 parts of maleic anhydride. The reaction vessel was evacuated (100 mm.) and the mixture of polybutene and maleic anhydride was heated with agitation for about five hours at temperatures in the range of about 220° C. to 230° C. The reaction mixture was cooled to about 150° C., transferred to a clean flask, and stripped of unreacted maleic anhydride under reduced pressure. After stripping, the material remaining was filtered, while hot, to yield polybutenyl (935) succinic anhydride, a clear, straw-colored liquid. Analysis of this material, by titration in benzene with sodium in isopropyl alcohol, showed it to contain 0.72 millimol of anhydride per gram of sample. Infrared analysis of this material as a film showed the expected anhydride bands at 1,870 cm.$^{-1}$ (5.35 microns) and 1,780 cm.$^{-1}$ (5.6 microns). No free carboxylic acid was present, as evidenced by the lack of a band at 1,720 cm.$^{-1}$ (5.85 microns).

Seven hundred and two parts of the polybutenylsuccinic anhydride, prepared as above, and 200 ml. of toluene were charged into a suitable vessel fitted with a Dean and Stark tube and other conventional accessories. After the resulting mixture was warmed to about 50° C., 47.6 parts of tetraethylene pentamine were slowly added over about 30 minutes. The mixture was then heated with agitation at temperatures in the range of about 120–140° C. for about 18 hours, during which time water of reaction was removed by azeotropic distillation. After the toluene was stripped (150° C./20 mm.), there remained N,N′-(3,6,9-triazaundecylene)-bis[polybutenyl (935) succinimide], a brown viscous oil. Infrared analysis of the product showed it to be the bis-imide having alkenyl side chains. The imide bands appeared at 1,770 cm.$^{-1}$ (5.65 microns) and 1,695 cm.$^{-1}$ (5.90 microns). Only a small amount of unreacted free acid was present, as indicated by the low value obtained by titration of a sample of the product in benzene with sodium in isopropyl alcohol. Typical values for analysis of this material: Total nitrogen, 2.1%; total amine, 0.97 milliequivalent per gram; tertiary amine, 0.40 milliequivalent per gram; Kinetic viscosity at 210° F., 1,928 cs.; specific gravity, 0.9260 at 100° F. and 0.8922 at 210° F.

EXAMPLE 2

In the manner of Example 1, 1,100 parts of polybutenyl (700) succinic anhydride were prepared and were then charged into a suitable reaction vessel. Three hundred ml. of toluene were charged and the resulting mixture was warmed to about 50° C. Seventy-two and eight-tenths parts of tetraethylene pentamine were then added dropwise and the reaction mixture heated at reflux until the amount of water collected equaled the theoretical. The reaction mass was then stripped at 150° C./20 mm. to yield N,N′-(3,6,9-triazaundecylene)-bis[polybutenyl (700) succinimide]. The structure was confirmed by infrared analysis.

EXAMPLE 3

In the manner of Example 1, 200 parts of polybutenyl (935) succinic anhydride were prepared and were then charged into a suitable reaction vessel. One hundred ml. of toluene and 5.8 parts of diethylene triamine were then charged, and the reaction mixture was heated at reflux until the amount of water collected was about equal to the theoretical. The reaction mass was then stripped at 150° C./20 mm. to yield N,N′-(3-azapentylene)-bis[polybutenyl (935) succinimide]. Titration with perchloric acid showed 0.23 milli-equivalent of titratable amine present per gram of sample.

EXAMPLE 4

In the manner of previous examples, 70 parts of polypropenyl (830) succinic anhydride were prepared and then charged into a suitable reaction vessel. One hundred ml. of toluene and 4.3 parts of tetraethylene pentamine were then charged, and the resulting mixture was heated at reflux until the amount of water collected was about equal to the theoretical. The reaction mass was then stripped of toluene to yield N,N′-(3,6,9-triazaundecylene)-bis[polypropenyl (830) succinimide].

EXAMPLE 5

In the manner of the foregoing examples, N,N′-(3,6,9-triazaundecylene) - bis[polybutenyl (1500) succinimide] was prepared from 220 parts of polybutenyl (1500) succinic anhydride and 6.5 parts of tetraethylene pentamine.

EXAMPLE 6

Into a suitable reaction vessel, there were charged 43.3 parts of polybutenyl (1330) succinic anhydride, 50 ml. of toluene, and 1.8 parts of 1,3-dipropylene triamine. The resulting reaction mixture was heated at reflux until the amount of water collected was about equal to the theoretical. The reaction mass was then stripped (150° C./15 mm.) to yield N,N′-(4-azaheptylene)-bis[polybutenyl (1330) succinimide]. Infrared analysis of the product showed the imide bands at 1,770 cm.$^{-1}$ (5.65 microns) and 1,695 cm.$^{-1}$ (5.90 microns).

In a similar manner, other bis-imides of this invention can be prepared, such as:

N,N′-(3,6,9-triazaundecylene)-bis(polyethylsuccinimide);
N,N′-(3-azapentylene)-bis(polybutenylsuccinimide);
N,N′-(3-azapentylene)-bis(polypropenylsuccinimide);
N,N′-(3-azapentylene)-bis(polyethenylsuccinimide);
N,N′-(3-azapentylene)-bis(polypentenylsuccinimide);
N,N′-(3,6-diazaoctylene)-bis(polypropenylsuccinimide);
N,N′-(3,6-diazaoctylene)-bis(polybutenylsuccinimide);
N,N′-(3,6-diazaoctylene)-bis(polypentenylsuccinimide);
N,N′-(3,6,9,12-tetraazatetradecylene)-bis(polyethenylsuccinimide);
N,N′-(3,6,9,12-tetraazatetradecylene)-bis(polypropenylsuccinimide);
N,N′-(3,6,9,12-tetraazatetradecylene)-bis(polybutenylsuccinimide);
N,N′-(3,6,9,12-tetraazatetradecylene)-bis(polypentenylsuccinimide);
N,N′-(4-azaheptylene)-bis(polypropenylsuccinimide);
N,N′-(4-azaheptylene)-bis(polybutenylsuccinimide);
N,N′-(4-azaheptylene)-bis(polypentenylsuccinimide);
N,N′-(4,8-diazaundecylene)-bis(polyethenylsuccinimide);
N,N′-(4,8-diazaundecylene)-bis(polybutenylsuccinimide);
N,N′-(4,8,12-triazapentadecylene)-bis(polypropenylsuccinimide);
N,N′-(4,8,12-triazapentadecylene)-bis(polybutenylsuccinimide);
N,N′-(5-azanonylene)-bis(polybutenylsuccinimide);
N,N′-(3-aza-2,5-dimethylpentylene)-bis(polypropenylsuccinimide);
N,N′-(3-aza-2,4-dimethylpentylene)-bis(polybutenylsuccinimide);
N,N′-(3,6-diaza-1,5,8-trimethyloctylene)-bis(polybutenylsuccinimide);
N,N′-(4-aza-3,7-dimethylheptylene)-bis(polybutenylsuccinimide);

and the like.

Several screening tests were utilized to demonstate the detergency effectiveness in gasoline engine oil formulations of the bis-imides of this invention. One test, referred to as the "Lacquer Deposition" test, involves passing burned gasoline fumes through a sample of a formulation in a suitable container under controlled conditions, after which the sample is aged in an oven. The amount of deposit is then determined by washing away the oil. A control formulation is run simultaneously. The figure reported represents the percent reduction in deposits when a bis-imide is present as compared to the amount of deposit when no bis-imide is present.

An additional test utilized, referred to as the "Carbon Shaking" test, involves the addition of 2% of the additive under test to a mixture of lampblack and hydrocarbon, shaking the resulting mixture, and then allowing the mixture to stand for 24 hours. The liquid layer is then observed and rated as opaque; heavy, medium, or light haze; or clear. A good detergent-dispersant should, of course, give a heavy haze or opaque rating.

Utilizing the above tests, the results presented in Table I, below, were observed.

*Table I*

| Test No. | Bis-Imide | Lacquer Deposition | Carbon Shaking |
|---|---|---|---|
| 1 | N,N'-(3,6,9-triazaundecylene)-bis[poly-butenyl (935) succinimide]. | 92 | Opaque. |
| 2 | N,N'-(3,6,9-triazaundecylene)-bis[poly-propenyl (830) succinimide]. | 42 | Do. |
| 3 | N,N'-(3,6,9-triazaundecylene)-bis[poly-butenyl (1500) succinimide]. | 97 | Do. |
| 4 | N,N'-(3,6,9-triazaundecylene)-bis[poly-butenyl (700) succinimide]. | 31 | Do. |
| 5 | N,N'-(3,6,9-triazaundecylene)-bis[poly-butenyl (1330) succinimide]. | 99 | Do. |
| 6 | N,N'-(3-azapentylene)-bis[polybutenyl (1330) succinimide]. | 83 | Do. |
| 7 | N,N'-(3-azapentylene)-bis[polybutenyl (935) succinimide]. | 63 | Do. |
| 8 | N,N'-(4-azaheptylene)-bis[polybutenyl (1330) succinimide]. | 94 | Do. |

As further illustration of the outstanding detergent-dispersant properties of the compounds of this invention, various engine tests were run on lubricating oil compositions containing bis-imides of this invention.

In Table II, below, data are presented which were obtained from FL-2 (CRC) tests. As known to those working in the art, the FL-2 (CRC) test is a test designed to measure sludge and varnish deposits and oil ring plugging caused by engine operation at moderate oil temperatures. In this test, a 216 cubic inch, 6-cylinder Chevrolet engine is operated at 2,500 r.p.m. for 40 hours, dismantled, and the varius parts observed and rated.

The piston varnish rating is a visual rating of the amount of varnish on the skirt of a piston, with a rating of 10 representing a perfectly clean piston and a rating of 0 representing a piston fully covered with varnish. After each piston was rated, the ratings were averaged and the average rating reported.

The oil ring rating signifies the extent of oil ring plugging, with a rating of 10 representing no plugging and a rating of 0 representing complete plugging. After each piston was rated, the ratings were averaged and the average rating reported.

The total rating is the over-all deposit rating obtained by measuring engine deposits at key points, such as on the push rod cover, the oil screen, the top deck, etc. Ratings range from 100 as the maximum (for a clean engine) to 0 as the minimum (for a dirty engine).

The formulations tested, designated with the letters "A" to "E," had the following composition:

Formulations A–D:                        Percent by weight
   Solvent-refined, Mid-Continent, SAE 30 oil __ 97.05
   Zinc salt of a mixed alkyl phosphorodithioate _ 0.95
   Bis-imide _____ 2.0

Formulation E:
   Solvent-refined, Mid-Continent, SAE 30 oil __ 98.05
   Zinc salt of a mixed alkyl phosphorodithioate _ 0.95
   Bis-imide _____ 1.0

*Table II*

| Formulation | Bis-Imide | Piston Varnish | Oil Ring | Total Rating |
|---|---|---|---|---|
| A | Example 1 | 9.3 | 10.0 | 96.4 |
| B | Example 2 | 8.0 | 10.0 | 89.6 |
| C | Example 5 | 9.2 | 10.0 | 90.5 |
| D | Example 6 | 8.9 | 9.7 | 86.9 |
| E | Example 1 | 8.3 | 10.0 | 91.3 |

The bis-imides were also tested in the L-1 (Supplement 1) and Lincoln MS engine tests. In the L-1 test, Formulation A gave no lacquer demerits after 240 hours and there was only 12% carbon filling, and after 480 hours, lacquer demerits were about 24 with only 15% carbon filling. In the Lincoln MS engine test, Formulation A gave an adjusted total varnish rating of 45.2 and an adjusted total sludge rating of 45.7, with no oil ring plugging, and Formulation E gave an adjusted total varnish rating of 44.5 and an adjusted total sludge rating of 31.8, with no oil ring plugging.

From the above, it is clear that the addition to lubricating oils of the bis-imides of the present invention brings with it a clear improvement of the dispersing and/or detergent qualities of said oils. Nevertheless the greater part of the commercial lubricating oils sold today is subject to a large number of uses, and it is therefore generally necessary to employ more than one type of additive in a finished lubricant composition. Thus, although the products of the present invention are effective detergents-dispersants, particularly for low temperature operations, it is frequently necessary to use the bis-imides of this invention in combination with other types of additives, such as metal-containing detergents and/or dispersants, corrosion inhibitors, oxidation inhibitors, extreme pressure agents, viscosity index improvers, pour-point depressors, anti-foaming agents, and the like.

A particularly useful combination of additives intended to be applied in motor lubricants is the combination of an additive of the present invention and a metal-containing derivative of phosphorus, such as metal phosphorodithioates, e.g., zinc dihexyl phosphorodithioate, the zinc salt of mixed alkyl phosphorodithioates where the alkyl groups are obtained, for example, from an equal mixture of isobutyl and n-amyl alcohols, and the metal salts of phosphorus sulfide-olefin polymer reaction products, and combinations thereof.

While this invention has been described with reference to various specific examples and embodiments, it is understood that the invention is not limited thereto and that it can be variously practiced within the scope of the following claims.

What is claimed is:

1. An N,N'-azaalkylene-bis(alkenylsuccinimide) of the formula,

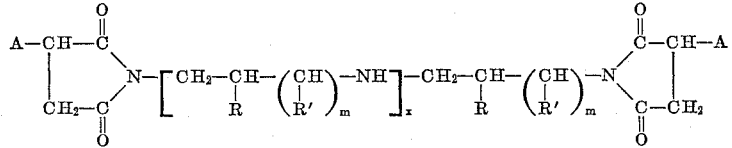

where A is alkenyl having a molecular weight of from about 500 to about 2,000 and derived from a lower alkene, $x$ is a whole number from one to four, R and R' are each selected from the group consisting of hydrogen and alkyl having from one to four carbon atoms, and $m$ is a whole number from zero to three.

2. An N,N'-azaalkylene-bis(alkenylsuccinimide) of the formula,

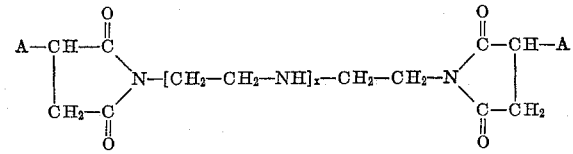

where A is alkenyl having a molecular weight of from about 500 to about 2,000 and derived from a lower alkene, and $x$ is a whole number from one to four.

3. An N,N'-azaalkylene-bis(alkenylsuccinimide) of the formula,

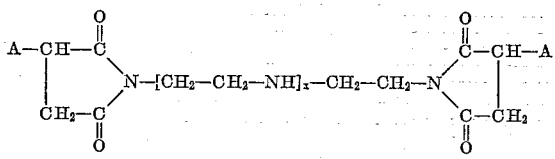

where A is alkenyl having a molecular weight of from about 700 to about 1,500 and derived from a lower alkene, and $x$ is a whole number from one to four.

4. An N,N'-azaalkylene-bis(alkenylsuccinimide) of claim 2 where $x$ is four.

5. An N,N'-azaalkylene-bis(alkenylsuccinimide) of claim 2 where A is polybutenyl.

6. An N,N'-(3,6,9-triazaundecylene)-bis(polybutenylsuccinimide) wherein the polybutenyl has a molecular weight of from about 500 to about 2,000.

7. An N,N'-(3,6,9-triazaundecylene)-bis(polybutenylsuccinimide) wherein the polybutenyl has a molecular weight of from about 700 to about 1,500.

8. An N,N'-(3,6,9-triazaundecylene)-bis(polybutenylsuccinimide) wherein the polybutenyl has a molecular weight of about 940.

9. An N,N'-azaalkylene-bis(alkenylsuccinimide of claim 2 where A is polypropenyl.

References Cited in the file of this patent

UNITED STATES PATENTS

| | | |
|---|---|---|
| 2,994,703 | Miller et al. | Aug. 1, 1961 |
| 3,004,987 | Paris et al. | Oct. 17, 1961 |
| 3,018,250 | Anderson et al. | Jan. 23, 1962 |
| 3,018,291 | Anderson et al. | Jan. 23, 1962 |
| 3,024,195 | Drummond et al. | Mar. 6, 1962 |
| 3,029,250 | Gaertner | Apr. 10, 1962 |